United States Patent [19]
Ota

[11] Patent Number: 5,477,372
[45] Date of Patent: Dec. 19, 1995

[54] OPTICAL SCANNER

[75] Inventor: Akira Ota, Saitama, Japan

[73] Assignee: Fuji Xerox Co., Ltd., Tokyo, Japan

[21] Appl. No.: 323,696

[22] Filed: Oct. 18, 1994

[30] Foreign Application Priority Data

Dec. 17, 1993 [JP] Japan .................................. 5-318639

[51] Int. Cl.⁶ .................................................. G02B 26/08
[52] U.S. Cl. .......................... 359/205; 359/216; 359/196
[58] Field of Search ................................. 359/196, 197, 359/205, 206, 212, 213, 214, 215, 216, 217, 218, 219, 220, 223, 225, 226

[56] References Cited

U.S. PATENT DOCUMENTS

| | | | |
|---|---|---|---|
| 4,955,682 | 9/1990 | Yamaguchi et al. | 359/206 |
| 5,179,465 | 1/1993 | Kondo | 359/218 |

FOREIGN PATENT DOCUMENTS

| | | |
|---|---|---|
| 58-140713 | 8/1983 | Japan . |
| 3-249720 | 11/1991 | Japan . |

*Primary Examiner*—Paul M. Dzierzynski
*Assistant Examiner*—Darren E. Schuberg
*Attorney, Agent, or Firm*—Finnegan, Henderson, Farabow, Garrett & Dunner

[57] ABSTRACT

An optical scanner for use with laser printers and the like. In the optical scanner, a semiconductor laser device is combined with an aperture and a collimator lens which is one single spherical planoconvex lens for collimating the emerging laser beam, the aperture and the collimator lens being arranged in that order on the side of the laser device from which the laser beam issues. The planar side of the collimator lens is directed towards the semiconductor laser device. The collimated laser beam is focused by a cylindrical lens to form a line image elongated in the main scanning direction. A polygonal mirror for deflecting the incident laser beam at a substantially uniform angular velocity in the main scanning direction is positioned in such a way that a reflecting surface of the mirror coincides with the position where the line image forms or with a nearby area. The beam reflected from the polygonal mirror is launched into an fθ lens, which converges it in such a way that a beam spot is scanned at a substantially uniform speed over the surface of a photoreceptor drum. For an installation-related reason, a reflector mirror is also provided between the fθ lens and the photoreceptor drum.

2 Claims, 5 Drawing Sheets

OPTICAL SCANNER

BACKGROUND OF THE INVENTION

1. Field of the Invention

The present invention relates to an optical scanner for use with laser printers and the like. More particularly, the invention relates to an optical scanner using lens optics for collimating the light from a light emitting source.

2. Description of the Related Art

Optical scanners are extensively used with optical printers, digital copiers and the like. The basic components of such optical sensors are: a light emitting source such as a semiconductor laser device; collimator lens optics with which the light beam issuing from the semiconductor laser device is collimated to parallel rays; cylindrical lens optics including a semi-cylindrical or cylindrical lens having different lens powers in sagittal and meridional directions; a deflector such as a polygonal mirror for deflecting the incident light in a direction corresponding to the main scanning direction; and an fθ lens as a scanning lens. The fθ lens has two functions, one for converging the deflected laser beam as a spot on a scanning surface such as a photoreceptor drum or belt, and one for moving the beam spot over the scanning surface at a substantially uniform speed.

As is well known, the light issued from semiconductor laser devices is divergent and, hence, in order to assure easy handling, the laser beam is often utilized after conversion to parallel rays by collimation with collimator lens optics.

Collimator lens optics are available in various types, such as a light source unit that performs collimation using a combined lens consisting of two or more spherical lens elements (see Japanese Patent Unexamined Publication No. Sho. 58-140713) and a light source unit that performs collimation using only one single aspheric lens element (see Japanese Patent Unexamined Publication No. Hei. 3-249720).

However, comprising collimator lens optics of two or more spherical lens elements has the disadvantage of the need to use an increased number of components. This results not only in complicated procedures of assembling, adjusting and other operations but also in a higher cost. If collimator lens optics is composed of one single aspheric lens element, the procedures of assembling, adjusting and other operations can be simplified but, on the other hand, aspheric lenses cannot be manufactured as easily and precisely as in the case of manufacturing spherical lenses by polishing or other mechanical methods; the method commonly used today is by molding glass but producing highly precise aspheric lenses consistently at low cost is difficult to realize by this method. Therefore, the optical scanner using collimator lens optics solely composed of one single aspheric lens is eventually costly.

SUMMARY OF THE INVENTION

The present invention has been accomplished under these circumstances and has an object to provide an inexpensive optical scanner by adopting a simple and less costly collimator lens.

To achieve the above object, the present invention provides an optical scanner including: a light source; lens optics with which light from the light source is collimated to substantially parallel rays; cylindrical lens optics for focusing the parallel rays of light to form a line image elongated in a direction corresponding to a main scanning direction; deflecting means by which light issuing from the cylindrical lens optics is deflected in a predetermined direction at a substantially uniform angular velocity; and scanning lens optics for converging the deflected light on a scanning surface in such a way that a beam spot is scanned at a substantially uniform speed, wherein the collimating lens optics is solely composed of a single spherical planoconvex lens having a numerical aperture greater than zero but no more than 0.07 and disposed in such a way that a planar portion of the single spherical planoconvex lens is directed toward the light source.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENT

Figure 1:
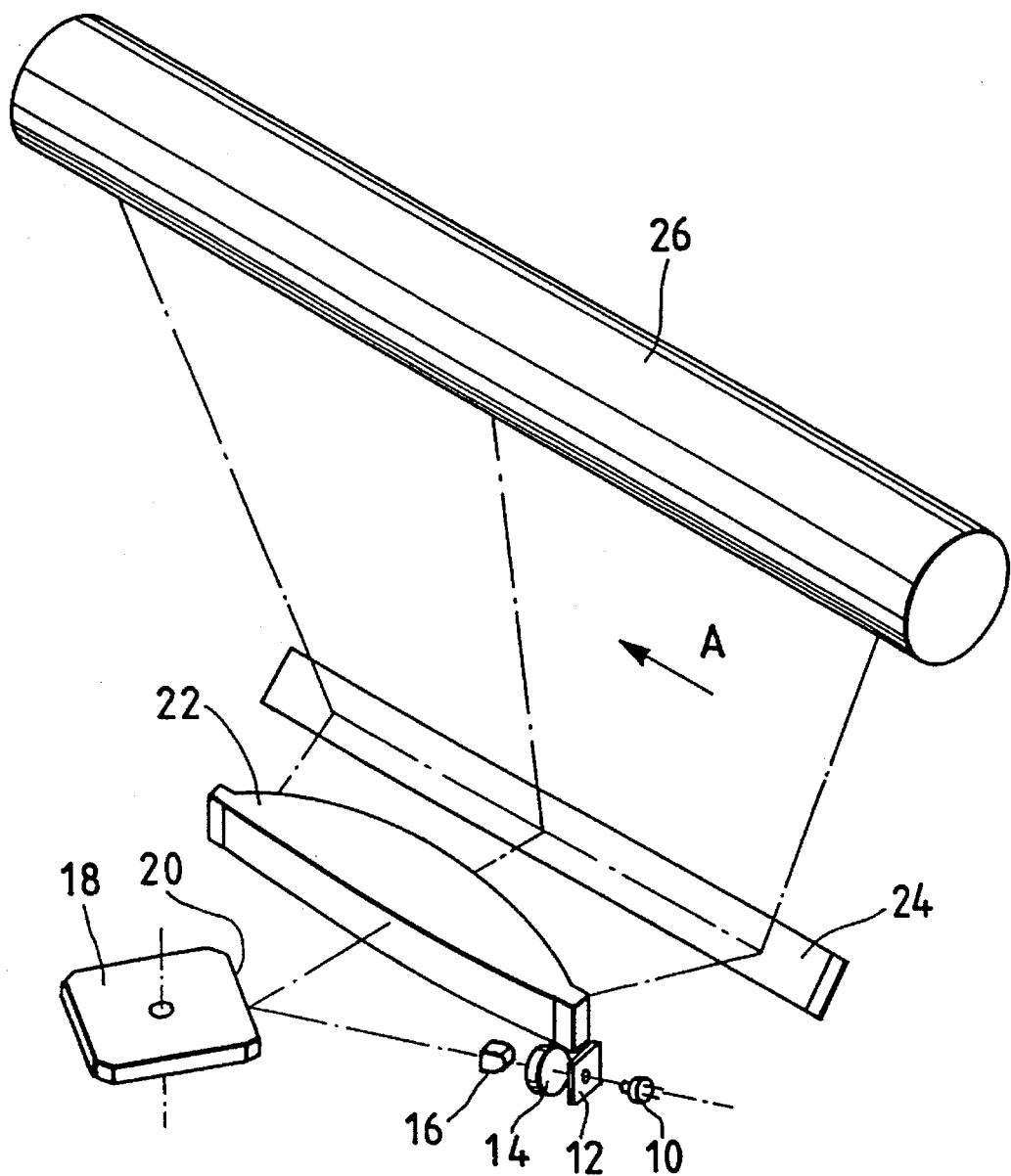
FIG. 1 is a diagram showing schematically an optical scanner according to an embodiment of the invention.

An optical scanner of the invention includes a light source, lens optics with which the light from the light source is collimated to substantially parallel rays, cylindrical lens optics for focusing the parallel rays of light to form a line image elongated in a direction corresponding to the main scanning direction, a deflecting unit by which the light issuing from the cylindrical lens optics is deflected in a predetermined direction at a substantially uniform angular velocity, and scanning lens optics for converging the deflected light on a scanning surface in such a way that a beam spot is scanned at a substantially uniform speed.

As stated in the "Description of the Related Art", the light issued from semiconductor laser devices is divergent and, hence, in order to assure easy handling, the laser beam must be converted to parallel rays by collimation with lens optics. In the present invention, such collimator lens optics is solely composed of one single spherical planoconvex lens element. This single spherical planoconvex lens element is so designed that its numerical aperture NA is greater than zero but no more than 0.07. The numerical aperture NA greater than zero but no more than 0.07 effectively limits the incident light so that the transmitted wave front aberration is reduced to approximately λ/10. As a result, imaging with the cylindrical lens and scanning lens optics can be accomplished without experiencing an increased (thickened) spot diameter due to aberrations.

It is also well known that the refractive action of a curved surface increases with decreasing radii of curvature. Therefore, light travels almost straight in a substantially planar part of a lens or the like. This means that in the case of using one single spherical planoconvex lens element to collimate divergent incident light to substantially parallel rays, one cannot effectively utilize the refractive action of the substantially planar part of the lens element if this part is positioned on the side from which the collimated light emerges. In the present invention, the planar part of the single spherical planoconvex lens element is positioned on the side where the light to be collimated is incident and this assures that the refractive action of the lens is developed both in the planar part on the entrance side and in the curved part on the exit side, whereby the lens is utilized effectively. As a result, the development of transmitted wave front aberrations can be suppressed more effectively than when the planar part of the single spherical planoconvex lens is positioned on the exist side.

If the single spherical planoconvex lens element is to be used as a collimator lens in the optical scanner of the invention, it preferably satisfies the following three conditions.

The first condition to be satisfied is n≧1.6, meaning that the refractive index n of the single spherical planoconvex lens element should be set at a value of 1.6 or more. If the refractive index n of the single spherical planoconvex lens element is less than 1.6, transmitted wave front aberrations will increase. More effective prevention of wave front aberrations can be realized by setting the value of n at 1.6 or more.

The second condition to be satisfied is 0<f3/f1≦9, meaning that the ratio of f3, or the focal length of the scanning lens in the main scanning direction, to f1, or the focal length of the single planoconvex lens, should be greater than zero but no more than 9. The cylindrical lens optics converges the collimated parallel rays by different lens powers in the main scanning direction and in the sub-scanning direction crossing the main scanning direction but it is mostly designed to have no lens power in the main scanning direction. Therefore, the performance of the optical scanner can at least be estimated by considering the relationship associated in a direction parallel to the main scanning direction in which the cylindrical lens optics has no lens power, namely, the ratio between f1 (the focal length of the single planoconvex lens) and f3 (the focal length of the scanning lens in the main scanning direction). The ratio f3/f1 is equivalent to an index of lens brightness; if this ratio exceeds 9, increased wave front aberrations will develop due to the collimating lens optics and thickening of the image spot occurs. Hence, considering the ratio f3/f1 is necessary for discussion of the spot size with brightness being also taken into account and an appropriate spot size can be attained on a scanning surface such as a photoreceptor drum or belt if the second condition set forth above is satisfied.

The third condition to be satisfied is 0<f2/f1≦4, meaning that the ratio of f2, or the focal length of the cylindrical lens optics in the sub-scanning direction, to f1, or the focal length of the single planoconvex lens, should be greater than zero but no more than 4. In other words, by considering the relationship associated in the direction in which the cylindrical lens optics has a lens power, namely, the ratio between f1 (the focal length of the single planoconvex lens) and f2 (the focal length of the cylindrical lens optics in the sub-scanning direction), one can further improve the precision for estimating the performance of the optical scanner. As in the case of f3/f1, if the ratio f2/f1 exceeds 4, increased wave front aberrations will develop due to the collimating lens optics and thickening of the image spot occurs. Therefore, an appropriate spot size can be attained on a scanning surface such as a photoreceptor drum or belt if the third condition set forth above is satisfied.

In the optical scanner, neither f2 (the focal length of the cylindrical lens optics in the sub-scanning direction) nor f3 (the focal length of the scanning lens in the main scanning direction) will be zero and, hence, the values of f3/f1 and f2/f1 in the second and third conditions, respectively, will in no way assume zero.

Hereinafter, an embodiment of the invention will be described in detail.

As shown schematically in FIG. 1, an optical scanner of the embodiment has a semiconductor laser device 10 (wavelength λ=785 nm) as a light source and an aperture 12 and a collimator lens 14 for shaping the light beam from the semiconductor laser device 10 to parallel rays are arranged in that order on the side of the laser device 10 from which laser beam issues. The numerical aperture NA of the collimator lens 14 which is an index of its performance is determined by the size of the aperture 12. A cylindrical lens 16 is positioned on the side of the collimator lens 14 from which the collimated laser beam emerges. The cylindrical lens 16 has a lens power in a direction corresponding to the sub-scanning direction (focal distance f2=65 mm) and permits the collimated laser beam to form a line image elongated in a direction corresponding to the main scanning direction (indicated by arrow A). A polygonal mirror 18 which reflects the incident laser beam and deflects it at a substantially uniform angular velocity in a direction corresponding to the main scanning direction is positioned in such away that a reflecting surface 20 will coincide either with the position where the line image forms or with a nearby area.

An fθ lens 22 (focal distance f3=143.24 mm) which is a single scanning lens element formed of plastics or glass is provided on the side of the polygonal mirror 18 from which the reflected laser beam emerges. The fθ lens 22 converges the reflected laser beam in such a way that a substantially circular beam spot having a diameter of approximately 80 μm is scanned at a substantially uniform speed over the surface of a photoreceptor drum 26 which serves as a scanning surface. For an installation-related reason, a reflector mirror 24 with which the laser beam issuing from the fθ lens 22 is reflected towards the photoreceptor drum 26 is provided between the two components.

In the embodiment under consideration, the cylindrical lens 16 is positioned on the entrance side of the polygonal mirror 18 to constitute pre-polygon optics and this mirror focuses the light beam from the semiconductor laser device 10 in such a way that a line image elongated in a direction corresponding to the main scanning direction is formed on the reflecting surface 20. The laser beam is then deflected by the polygonal mirror 18 at a substantially uniform angular velocity in a direction corresponding to the main scanning direction and subsequently launched into the fθ lens 22, which performs scanning over the photoreceptor drum 26 in the main scanning direction at a substantially uniform speed. The fθ lens 22 also performs anti-tilt correction to correct any uneven pitches in the sub-scanning direction. The cylindrical lens 16 also works to form a substantially circular beam spot on the photoreceptor drum 26.

Figure 2A:
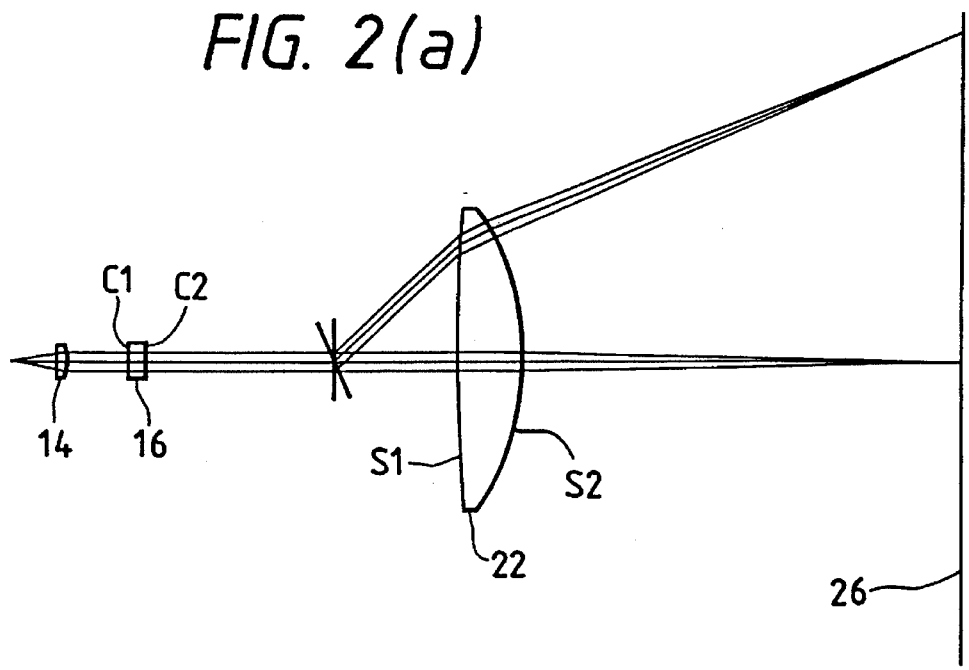
FIG. 2(a) is a ray tracing diagram for the optical scanner of the embodiment as taken in the main scanning direction.
Figure 2B:
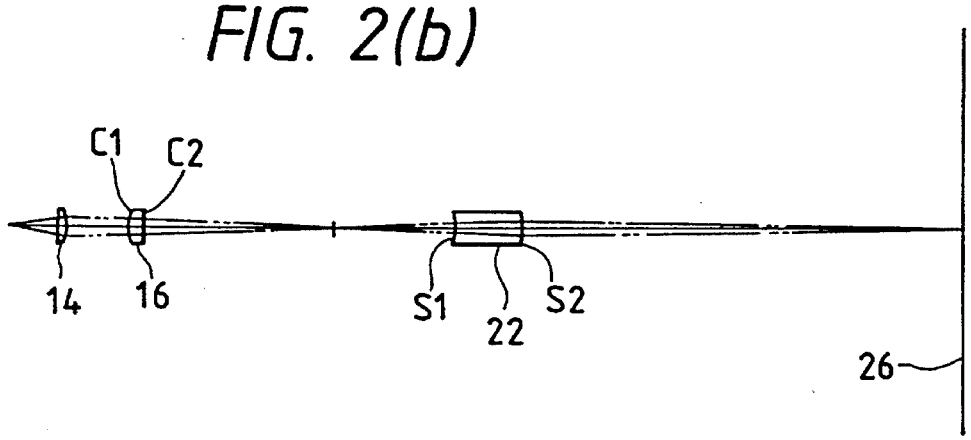
FIG. 2(b) is a ray tracing diagram for the optical scanner of the embodiment as taken in the sub-scanning direction.

FIGS. 2(a) and 2(b) illustrate the essential part of FIG. 1 as it is unassembled and seen in two directions. FIG. 2(a) shows the geometries of individual lenses in the deflecting plane of the fθ lens 22 (or the plane which the principal rays of laser beam deflected by polygonal mirror 18 will form and this is equivalent to a cross section taken in the main scanning direction), and FIG. 2(b) shows the lens geometries in a plane crossing the deflecting plane at right angles (or the plane that includes the optical axis of the fθ lens 22 and which is perpendicular to the deflecting plane and this is equivalent to a cross section taken in the sub-scanning direction).

The cylindrical lens 16 (focal distance f2=65 mm) used in the embodiment under consideration is a planoconvex lens having a planar surface C1 on the side facing the collimator lens 14 and a curved surface C2 having a curvature radius of 33.22 mm in the sub-scanning direction. Other design values of the cylindrical lens 16 are: refractive index n=1.511083 and center thickness=5 mm.

The fθ lens 22 (focal distance f3=143.24 mm) is a toric lens with refractive index n=1.510139; the lens surface S1 directed towards the polygonal mirror 18 (deflector) is aspheric whereas the surface S2 directed towards the photoreceptor drum 26 (or scanning surface) is toric. The shape of this lens has such a meniscus that the on-axis radius of curvature is 66.88 mm and −17.9 mm in order from the deflector side in a cross section taken in the sub-scanning direction. The aspheric lens surface S1 is of such a shape that it has an on-axis radius of curvature of 410.65 mm towards the deflector side in a cross section taken in the main scanning direction. The lens surface S1 is provided with aspheric constants so as to form an aspheric surface. The lens surface S2 has a radius of curvature of −88.75 mm in a cross section taken in the main scanning direction and its center thickness is 22.6 mm. The curved surface C2 on the deflector side of the cylindrical lens 16 is spaced from the deflecting surface 20 by a distance of 62.04 mm; the deflecting surface 20 and the lens surface S1 of the fθ lens 22 on the deflector side are spaced apart by a distance of 39.64 mm; and the lens surface S2 of the fθ lens 22 which is directed towards the scanning surface is spaced from the photoreceptor drum 26 by a distance of 139.4 mm.

Figure 3:
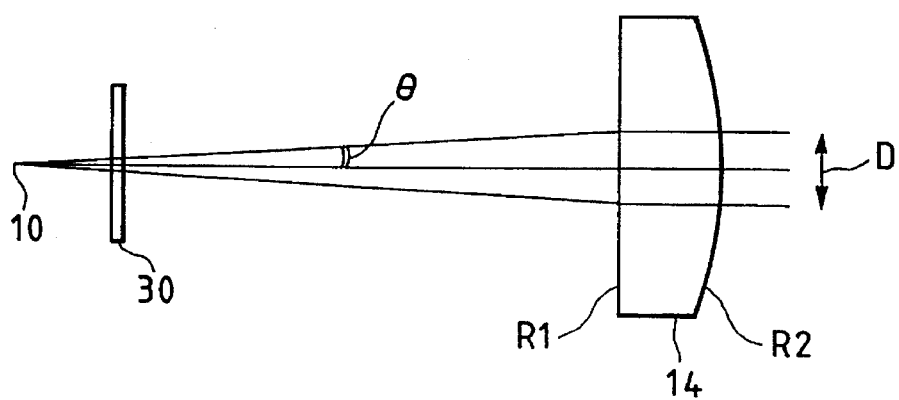
FIG. 3 is a diagram showing the collimator lens portion of the optical scanner of the embodiment and the nearby area.

FIG. 3 is an enlarged view of the collimator lens 14 and the nearby area. The collimator lens 14 is a single spherical lens that is made from optical glass (SF 10; n=1.712018) and which is defined by a planar surface R1 and a curved surface R2. The curved surface R2 is designed to have a radius of curvature of 14.24 mm and a center thickness of 3 mm to provide focal distance f1=20 mm. The collimator lens 14 is positioned in such a way that the planar surface R1 is directed towards the semiconductor laser device 10. A thin glass plate 30 is provided between the semiconductor laser device 10 and the collimator lens 14. Being supplied as a component of the package of the semiconductor laser device 10, the thin glass plate 30 has little effect on the aberration if it is used with a collimator lens having a small numerical aperture NA setting as in the case of the present invention. The aperture 12 is so set that the parallel rays of light emerging from the collimator lens 14 will produce a spot size with a diameter D of 2.4 mm. The numerical aperture NA of the collimator lens 14 is determined by the following equation (1):

$$NA = (D/f1)/2 = D/2f1 \tag{1}$$

According to this equation, NA is calculated to be 0.06 in the optical scanner of the embodiment under consideration. In FIG. 3, NA is also equal to sinθ.

Figure 4A:
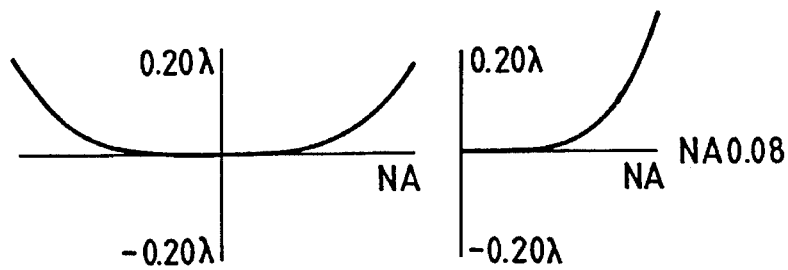
FIGS. 4(a) to 4(d) are graphs showing the relationship between the transmitted wave front aberrations that occur in the optical scanner of the embodiment and the numerical aperture of the collimator lens.
Figure 4B:
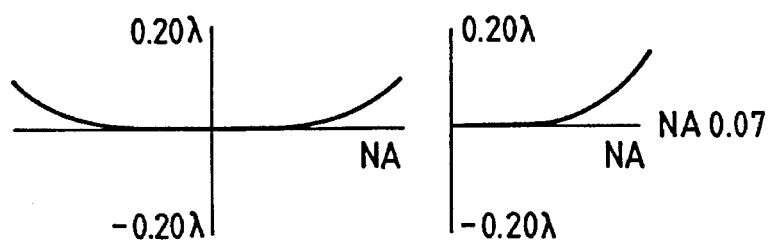
Figure 4C:
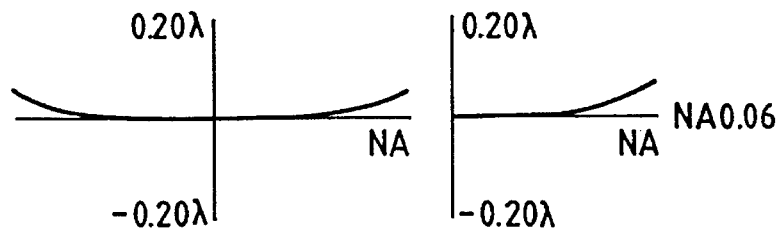
Figure 4D:
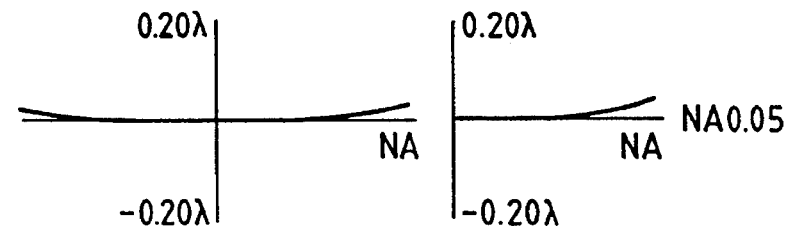

FIG. 4(c) shows the transmitted wave front aberrations that occur in the optical scanner for the case where the collimator lens 14 has a numerical aperture NA of 0.06, and FIG. 4(d) refers to the case where the NA of the collimator lens is 0.05. If NA=0.05, only small wave front aberrations occur and the collimator lens 14 has satisfactory performance; if NA=0.06, the wave front aberrations are comparable to λ/10 but the effects they cause are too small to cause practical problems. FIGS. 4(a) and 4(b) show the transmitted wave front aberrations that occur in the optical scanner for the cases where the collimator lens 14 is set to have numerical apertures of 0.08 and 0.07, respectively. Obviously, NA values greater than 0.07 cause so great wave front aberrations that the diameter of image spot will increase (spot thickening).

Figure 5A:
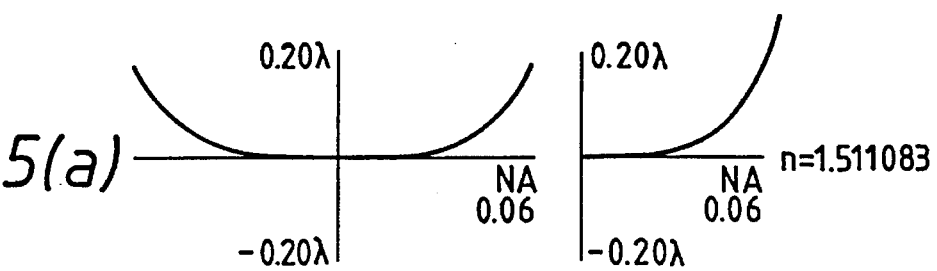
FIGS. 5(a) to 5(c) are graphs showing the relationship between the transmitted wave,front aberrations that occur in the optical scanner of the embodiment and the refractive index of the collimator lens.
Figure 5B:
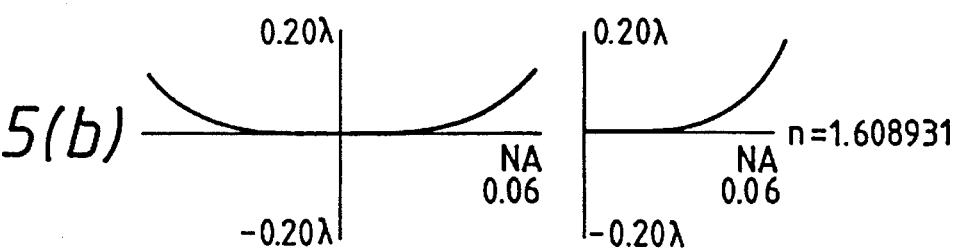
Figure 5C:
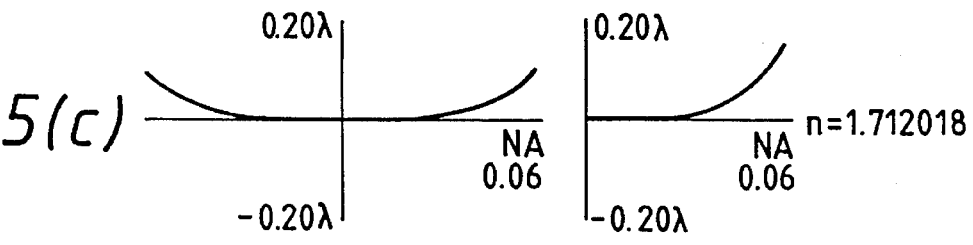

FIGS. 5(a) to 5(c) illustrate how the transmitted wave front aberrations that occur in the optical scanner will change in response to variations in the refractive index n of the collimator lens 14 which has a constant NA value of 0.06. FIG. 5(a) shows the transmitted wave front aberrations that occur when n=1.511083; FIG. 5(b) shows the case for n=1.608931; and FIG. 5(c) shows the case for n=1.712018. Obviously, n values smaller than 1.6 cause the transmitted wave front aberrations to approach λ/5 and the diameter of the image spot will increase (spot thickening). Therefore, one can understand that the refractive index value n of the collimator lens 14 is advantageously 1.6 or more.

Looking at the relationship between the collimator lens 14 and the fθ lens 22, one can see that the value of γ1 (f3/f1: f1 is the focal length of the collimator lens 14 and f3 is the focal length of the fθ lens 22) is 7.16 in the embodiment under consideration. Consider here the case of varying the value of f1, or the focal length of the collimator lens 14, as it is used in combination with the fθ lens 22 (f3: 143.24 mm); if the value of γ1 exceeds 9, f1 will become smaller than 16 mm. If one wants to produce a spot diameter comparable to the case where γ1 is 7.16, one has to insure that the numerical aperture NA of the collimator lens is set at a value greater than 0.075. As a result, the focal length of the collimator lens may decrease slightly but, on the other hand, increased wave front aberrations will develop to produce a thicker image spot. Hence, one can understand that the upper limit of the ratio γ1 (f3/f1) is 9. The γ1 value of 4 is equivalent to a NA value of 0.033 and γ1 values smaller than 4 are not preferred since the quantity of admitted light will decrease.

Figure 6A:
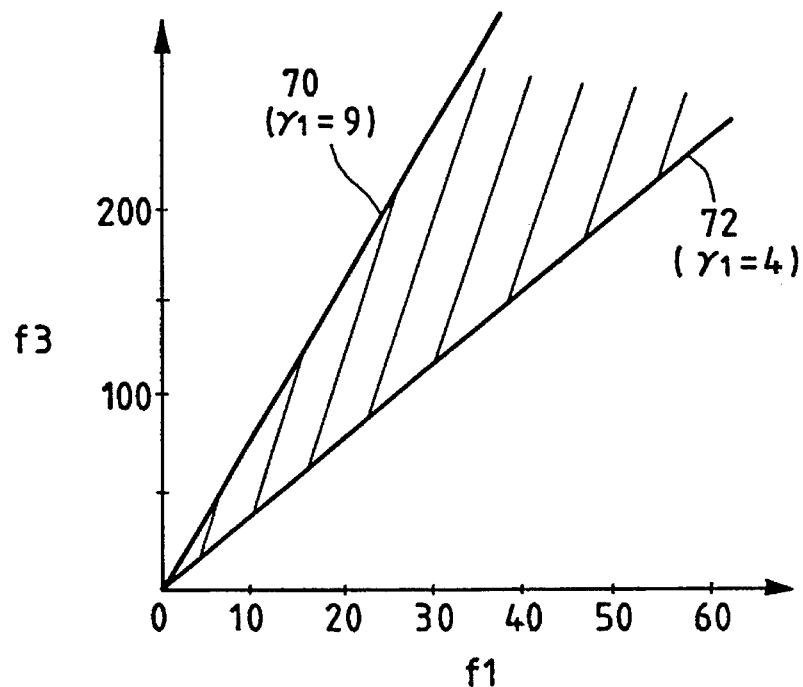
FIG. 6(a) is a characteristic diagram showing the relationship between the focal lengths of the collimator lens and the scanning lens in the optical scanner of the embodiment.

Therefore, if one draws a graph on a coordinate plane as shown in FIG. 6(a) by plotting the focal lengths f1 and f3 along x- and y-axes, respectively, the region bounded by a characteristic line 70 for γ1=9 and a characteristic line 72 for γ1=4 (as hatched in FIG. 6(a)) can be assigned as a practical range.

Speaking now of the relationship between the collimator lens 14 and the cylindrical lens 16, one can see that the value of γ2 (f2/f1: f1 is the focal length of the collimator lens 14 and f2 is the focal length of the cylindrical lens 16) is 3.25 in the embodiment under consideration. Consider here the case of varying the value of f1, or the focal length of the collimator lens 14, as it is used in combination with the cylindrical lens 16 (f2: 65 mm); if the value of γ2 exceeds 4, f1 will become smaller than 16.5. If one wants to produce a spot diameter comparable to the case where γ2 is 3.25, one has to readjust the NA of the collimator lens 14 to 0.073 or more. But then increased wave front aberrations will again develop to produce a thicker image spot. The value of NA that would reduce the quantity of light that can be admitted is equivalent to 0.033 and the value of γ2 for this case is calculated to be 1.5.

Figure 6B:
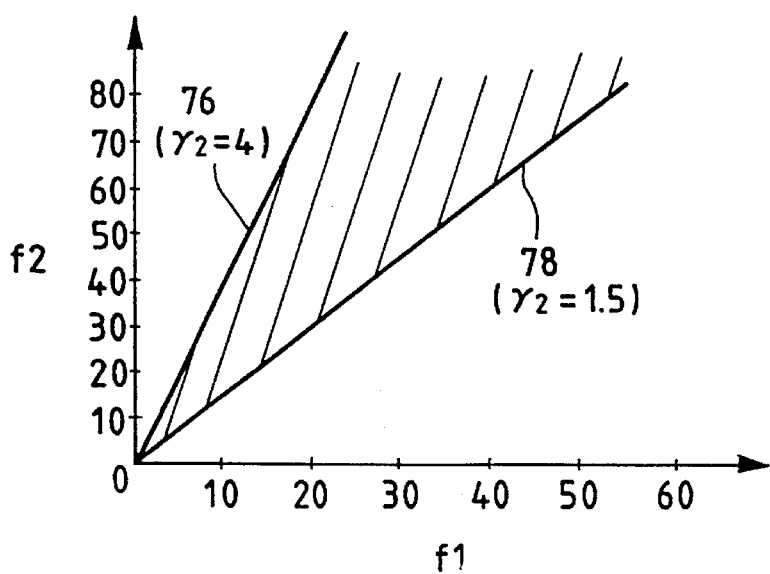
FIG. 6(b) is a characteristic diagram showing the relationship between the focal lengths of the collimator lens and the cylindrical lens in the optical scanner of the embodiment.

Therefore, if one draws a graph on a coordinate plane as shown in FIG. 6(b) by plotting the focal lengths f1 and f2 along x- and y-axes, respectively, the region bounded by a characteristic line 76 for γ2=4 and a characteristic line 78 for γ2=1.5 (as hatched in FIG. 6(b)) can be assigned as a practical range.

As described on the foregoing pages, the present invention uses one inexpensive single spherical planoconvex lens element as the sole component of collimator lens optics which converts the light beam from the light source to substantially parallel rays of light and, therefore, it offers the advantages of realizing an optical scanner that can be manufactured in a smaller size and at a lower cost.

What is claimed is:

1. An optical scanner comprising:

a light source;

collimating lens optics for collimating light from said light source to substantially parallel rays;

cylindrical lens optics for focusing the parallel rays of light to form a line image elongated in a direction corresponding to a main scanning direction;

deflecting means for deflecting light from said cylindrical lens optics in a predetermined direction at a substantially uniform angular velocity; and scanning lens optics for converging the deflected light on a scanning surface to scan a beam spot at a substantially uniform speed, wherein said collimating lens optics consists essentially of a single spherical planoconvex lens having a numerical aperture greater than zero but no more than 0.07 and disposed in such a way that a planar portion of said single spherical planoconvex lens is directed toward said light source.

2. The optical scanner according to claim 1, which satisfies the following conditions:

$n \geq 1.6$ $0 < f3/f1 \leq 9$ $0 < f2/f1 \leq 4$ wherein n is a refractive index of said single planoconvex lens, f1 is a focal length of said single planoconvex lens, f2 is a focal length of said cylindrical lens optics in a sub-scanning direction crossing the main scanning direction, and f3 is a focal length of said scanning lens optics.

* * * * *